E. SEVERSON.
LEAD TRUCK FOR HARVESTERS AND BINDERS.
APPLICATION FILED JULY 14, 1920.
1,418,889.
Patented June 6, 1922.
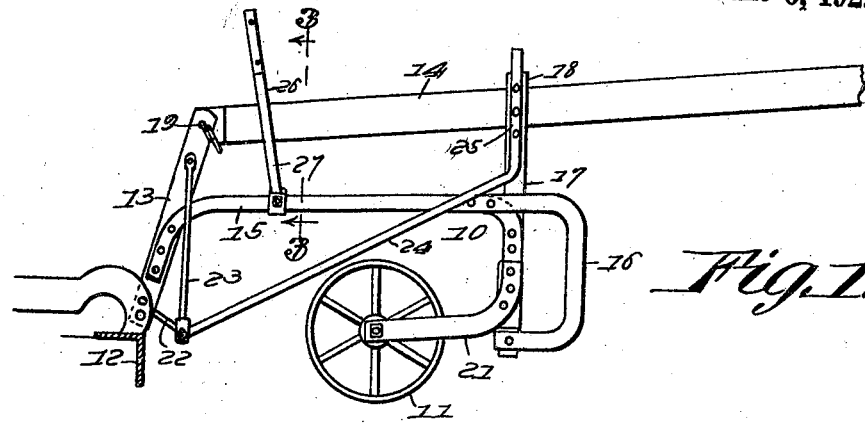
Fig. 1.
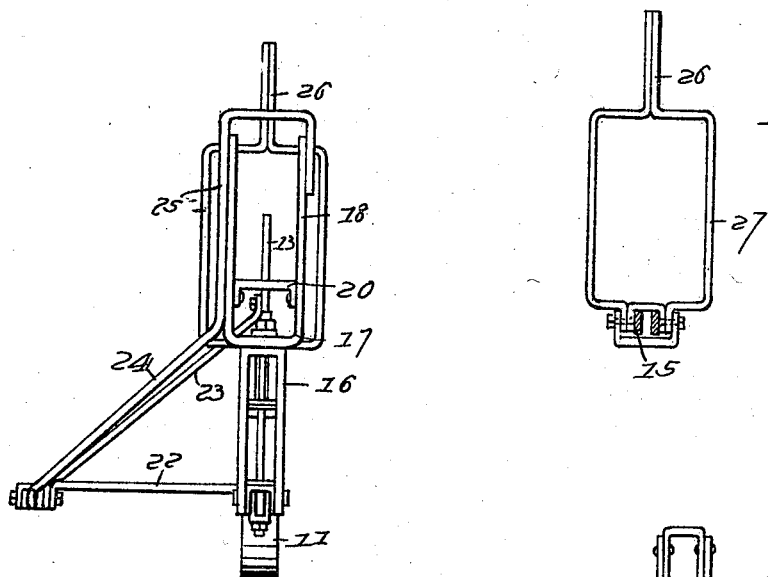
Fig. 2.
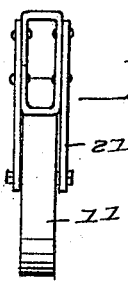
Fig. 3.
Fig. 4.
Inventor
Elmer Severson
By
Attorney

UNITED STATES PATENT OFFICE.

ELMER SEVERSON, OF DEERFIELD, WISCONSIN.

LEAD TRUCK FOR HARVESTERS AND BINDERS.

1,418,889.   Specification of Letters Patent.   Patented June 6, 1922.

Application filed July 14, 1920. Serial No. 396,071.

*To all whom it may concern:*

Be it known that I, ELMER SEVERSON, a citizen of the United States of America, residing at Deerfield, in the county of Dane and State of Wisconsin, have invented new and useful Improvements in Lead Trucks for Harvesters and Binders, of which the following is a specification.

The object of the invention is to provide a truck attachment for harvesters and binders and similar agricultural machines to support and guide that portion of the frame of the same which is adjacent to the point of connection of the draft tongue and incidentally to support the rear end of the draft tongue to the end that the draft animals connected with the tongue are relieved of the weight of the rear end thereof and are not subjected to the strain incident to the forward movement of the front end of the machine frame as the latter traverses the ground of which the surface is uneven or undulating; and furthermore to provide a means in this connection whereby a uniform support of the stubble end of the machine frame is provided to correspond with the support of the grain end thereof so that the sickle bar is maintained throughout its length in proper relation to the surface of the ground regardless of irregularities thereof; and with these objects in view, the invention consists in a construction and combination of parts, of which a preferred embodiment is shown in the accompanying drawings, wherein:—

Figure 1, is a side view of a lead truck attachment embodying the invention.

Figure 2, is a front view of the same.

Figure 3, is a detail view of the intermediate brace by which connection is made between the truck and the machine frame and looking at the same in the plane indicated by the line 3—3 of Figure 1.

Figure 4, is a view of the pilot wheel showing the means of attachment thereof to the truck frame.

The truck which is indicated generally at 10 and provided with a pilot wheel 11 is rigidly connected with the frame of the harvester which is indicated in section at 12 in Figure 1 by means of a standard 13 the upper end of which is pivotally connected to the draft tongue 14. The frame of the truck in the construction illustrated embodies the beam 15 which may consist of laterally spaced members as indicated in section in Figure 3 secured at its rear end to the standard 13, and having at its forward end a return bend 16 to afford a substantial support for the upright 17, constructed at its upper end to form a guide 18 for the tongue and serving to permit vertical movement of the latter on its pivot 19 while restricting the lateral movement thereof, relative downward movement of the tongue in the guide being limited by the transverse stop 20.

The fork 21 of the pilot or lead wheel is attached to the upright 17 and extends rearwardly therefrom so that the said wheel is disposed substantially under the center of the length of the truck frame as shown clearly in Figure 1.

In order to afford transverse rigidity of the truck frame relative to the main frame represented at 12, and also to resist any tendency of independent lateral movement of the tongue by maintaining the guide 18 in proper relative position, there is employed a transverse brace rod 22 terminally connected to the standard 13 and the obliquely disposed braces 23 and 24, the former of which is disposed in a transverse vertical plane and the latter in forwardly inclined position relative to the machine frame, to the end that said brace rod 24 is disposed in the position which is oblique with reference to both the vertical and horizontal planes and extends from the outer end of the transverse substantially horizontal brace rod 22 in a forwardly, upwardly and inwardly inclined position to the point of attachment as indicated at 25 to the upper portion of the upright 17, or that portion of said upright which constitutes the tongue guide 18.

The truck frame is also provided with an intermediate brace 26 extending from an intermediate portion of the beam 15 upwardly to a suitable point for attachment to the frame of the harvester or binder, said brace being intermediately expanded as indicated at 27 around the tongue to permit of free vertical swinging movement of the latter.

In turn the truck which is thus disposed at the stubble end of the frame of the harvester or binder in front of the bull wheel serves to support the stubble end of the frame so as to insure the movement thereon in conformity with the grain end of the frame which in the ordinary practice is in turn supported by the grain wheel or roller and the pilot or lead wheel of the truck follows the irregularities in the surface of the ground traversed and thus permits the cutter bar to follow the surface of the soil without imposing any downward or upward strain upon the rear end of the tongue which while being supported by the truck so far as the weight of its inner end is concerned, is free to follow the movements of the draft animals instead of being subject to the vibrations caused by the binder frame in its movement over uneven ground.

The invention having been described, what is claimed as new and useful is:—

1. A lead truck for harvesters and binders having a frame consisting of a standard for rigid attachment to the machine frame, a forwardly extending beam attached to said standard and having at its forward end a return bend, an upright carried by the return bend of said beam, a lead or pilot wheel having a fork attached to said upright, and an intermediate brace connected with the beam at an intermediate point of its length and adapted for attachment to the machine frame, the draft tongue being connected pivotally with the upper end of said standard, said upright being provided with the guide for embracing and limiting the lateral movement of the tongue.

2. A lead truck for harvesters and binders having a frame consisting of a standard for rigid attachment to the binder frame, a forwardly extending beam attached to said standard and provided with a returned bend at its forward end, a draft tongue pivotally connected at its rear end with the upper end of said standard, an upright carried by the returned bend and consisting of spaced parallel members deflected laterally in opposite directions above the beam to provide a guide for disposition in embracing relation with the draft tongue, a lead or pilot wheel having a fork attached to said upright, the fork extending rearwardly from the upright to dispose the lead wheel in a substantially intermediate position below said beam, and a guide in surrounding relation to the draft tongue at the rear and extending upwardly from said beam.

In testimony whereof he affixes his signature.

ELMER SEVERSON.